Dec. 14, 1954     L. A. LE LAURIN     2,696,925
REFUSE COMPRESSING BODY FOR VEHICLES
Filed June 21, 1954     2 Sheets-Sheet 2
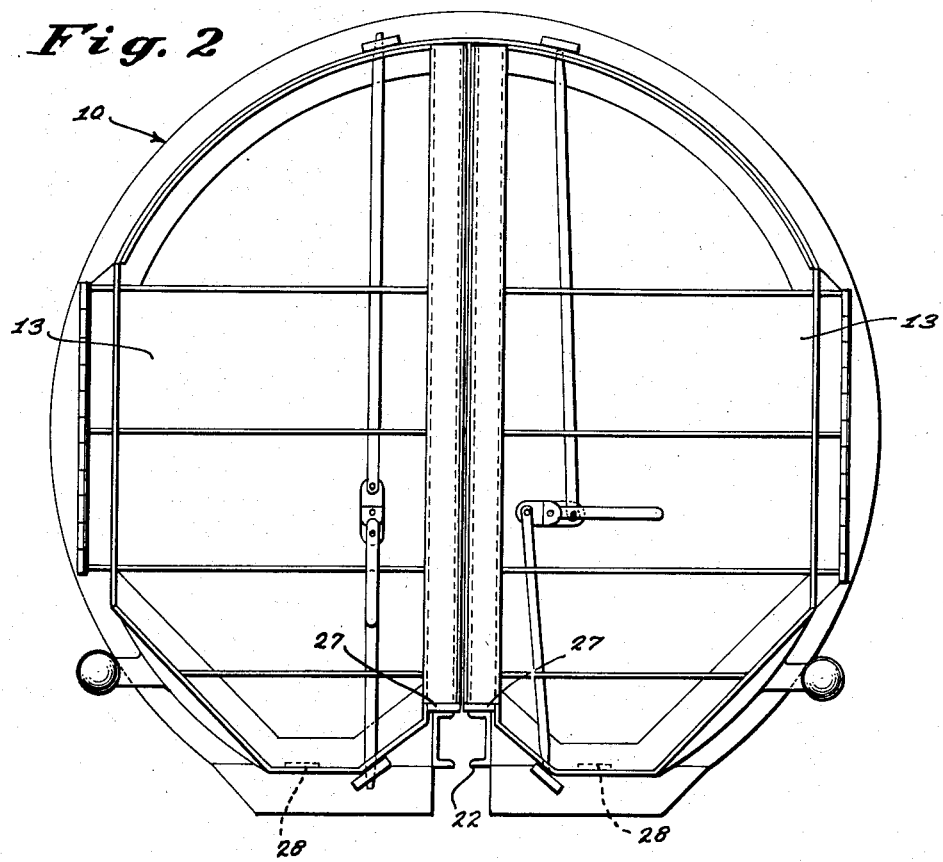
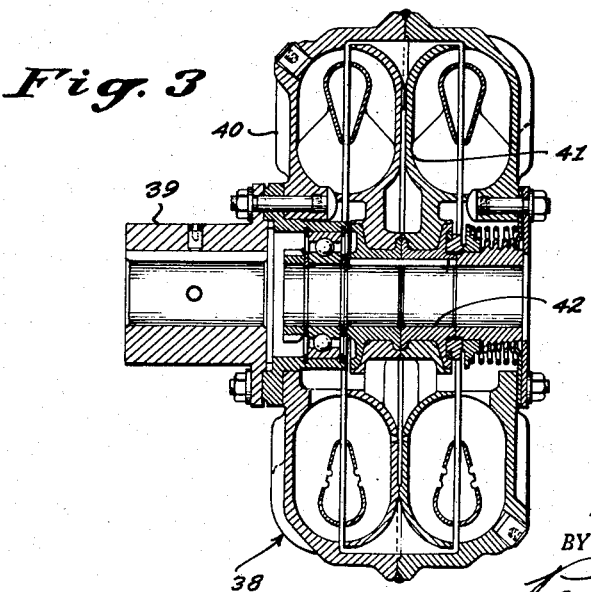
INVENTOR.
LOUIS A. LE LAURIN
BY
Parrott & Richards
ATTORNEYS United States Patent Office 2,696,925
Patented Dec. 14, 1954

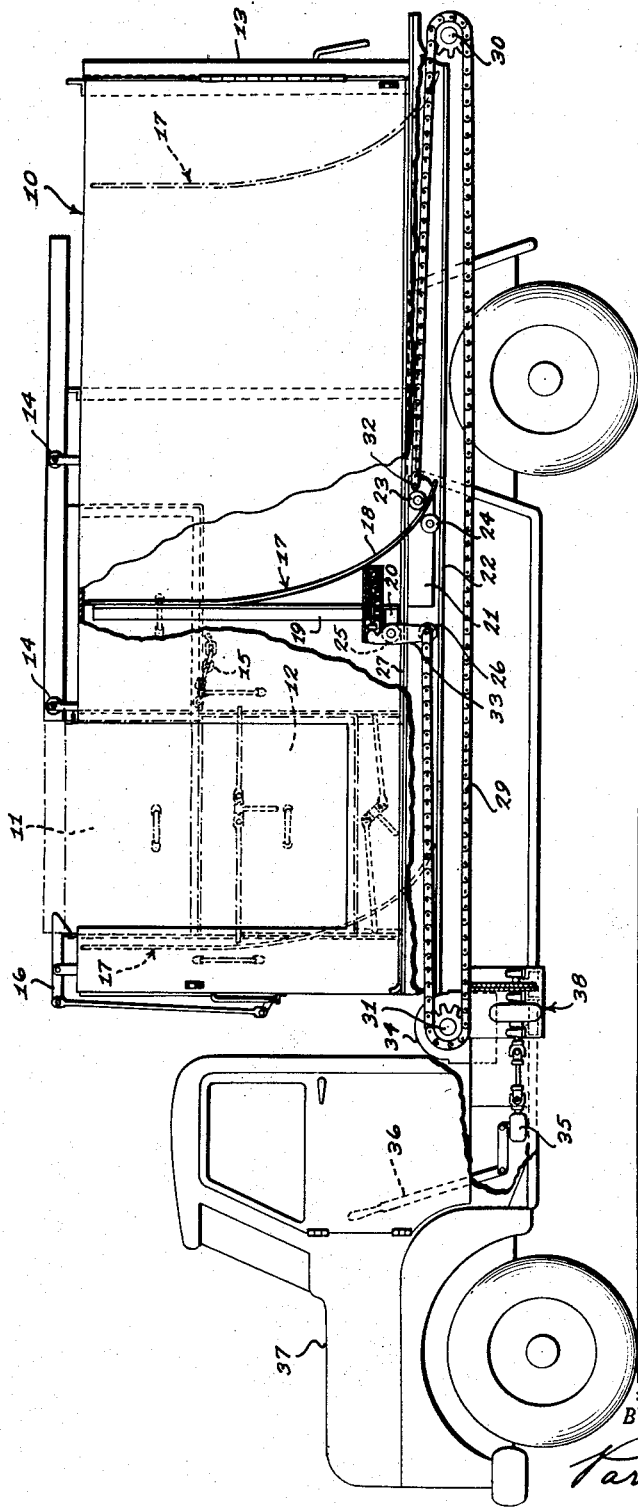

2,696,925

REFUSE COMPRESSING BODY FOR VEHICLES

Louis A. Le Laurin, San Antonio, Tex.

Application June 21, 1954, Serial No. 438,139

4 Claims. (Cl. 214—82)

This invention relates to a refuse body for compressing and transporting refuse therein and adapted to be mounted on a motor truck and operated by power supplied from the truck motor, as disclosed in U. S. Patents No. 2,258,988, issued October 14, 1941, and No. 2,557,003, issued June 12, 1951; and more particularly to a refuse body of this type incorporating an improved power transmission system for supplying the power necessary to carry out the operation of compressing refuse within the body.

According to the present invention, a refuse body having a compressor plate therein is arranged to have propelling power supplied to the compressor plate through a speed reducer from a reversible power take-off, with means interposed between the speed reducer and power take-off for slipping upon a stalling of the compressor plate within the refuse body and thereby greatly facilitating the compression operation.

An illustrative example of the above-mentioned means located between the speed reducer and the power take-off for slipping when the compressor plate stalls or meets an obstruction within the refuse body, such as either end of he refuse body or a mass of refuse which has been tightly packed therein, is a fluid coupling or clutch. This fluid coupling will begin to slip and continue to slip as long as the stalled condition exists, while still permitting the motor truck to idle and thereby prevent choking or stalling of the motor. Furthermore, this fluid coupling makes possible a more uniform movement of the compressor plate and thereby a more easily controlled and uniform compressing of the refuse contained in the body.

The basic concept for slipping of a clutch in a refuse body of this type is disclosed in my above Patent No. 2,258,988, issued October 14, 1941. As disclosed in that patent, an arrangement is provided for slipping of the motor clutch when the compressor plate reaches its limit of travel, which thereby disconnects the power from the motor to the compressor plate and avoids damage to the compressor plate which would otherwise occur.

The fluid coupling used in the power transmission system of the present invention makes any manipulation of the motor clutch unnecessary while still preventing any stalling of the truck motor. This fluid coupling constitutes one of the several associated members in the power transmission system between the motor truck and the compressor plate, which includes a power take-off connected to the truck motor and a speed reducer which is connected by elongated flexible means with the compressor plate. The flexible connecting means may be in the form of a chain or cable or the like, connected to the compressor plate and to the speed reducer and adapted to transmit the propelling power to the compressor plate that is supplied by the truck motor and transmitted through the power take-off, the fluid clutch and the speed reducer connected in cooperative relationship in that order.

These and other features of the present invention are described in detail below in connection with the accompanying drawings, in which:

Fig. 1 is a side elevation, partly in section, showing a refuse body arranged in accordance with the present invention;

Fig. 2 is a rear view of the refuse body shown in Fig. 1; and

Fig. 3 is a sectional detail of a preferred form of slipping means for use in the power transmission system.

The refuse body illustrated in the drawings as an embodiment of the present invention is indicated generally by the reference numeral 10, and, as shown, comprises a closed, elongated, body having side loading doors as at 11 and 12 arranged adjacent its forward end and dumping door 13 closing its rear end. One side loading door 11 is arranged at the top of the refuse body 10 for sliding horizontally between open and closed positions on rollers 14, with a chained hook 15 being provided for holding the door 11 in open position and a latch mechanism 16 to hold it in closed position, as desired. The other side loading doors 12 are arranged at each side of the refuse body 10 for lowering vertically so as to provide a large and easily accessible loading opening.

Inside the refuse body 10, a compressor plate, as indicated generally at 17, is arranged transversely for longitudinal movement throughout the length of the body 10, as illustrated by the alternate dotted line representations thereof. This compressor plate 17 comprises a transverse face member 18 presenting a working surface in opposed relation to the rear dumping doors 13, vertical and transverse brace members 19 and 20, and a longitudinal connecting bar 21 arranged centrally and vertically at the lower portion of the compressor plate 17 and at which it is connected to have power for compressing operation supplied thereto.

The connecting bar 21 of the compressor plate 17 is disposed within a central floor channel 22 extending throughout the length of the refuse body 10, and housing spaced pairs of rollers at 23 and 24 arranged rearwardly on the connecting bar 21 to bear respectively at the upper and lower faces of channel 22 for supporting the compressor plate 17 to move readily in either direction along the channel 22. Rollers 25 and 26 are also arranged forwardly in the compressor plate structure to ride rails 27 and 28 on top of the floor channel 22 and at each side thereof (see Fig. 2) for steadying movement of the compressor plate 17.

The power connection to the compressor plate 17 is made through flexible means, such as a sprocket chain 29, arranged for pulling it longitudinally in either direction within the body 10. For this purpose the sprocket chain 29 is extended over idler and drive sprockets 30 and 31 adjacent the rear and forward ends of the truck body 10 to reach within the channel 22 from a fixed anchor point 32 at the rear end of the compressor plate connecting bar 21 to a spring biased lever 33 arranged on the transverse brace member 20 for maintaining the sprocket chain 29 tight. By this arrangement, it will be seen that the compression space in the body 10 between the rear working face of the compressor plate 17 and the rear dumping doors 13 is maintained entirely clear and unobstructed by any operating elements.

The power transmission system by which propelling power is supplied to the compressor plate 17 through the sprocket chain 29 comprises a speed reducer 34 arranged in driving relation at the drive sprocket 31, a reversible power take-off 35 controlled by an operating lever 36 and connected to the motor of a motor truck 37 through the clutch thereof, and a fluid coupling, as indicated generally at 38, connecting the speed reducer 34 to the power take-off 35. As shown in Fig. 3, the fluid coupling 38 is provided with a connecting flange 39 to receive and be fixed on an input shaft connected from the output of the power take-off 35, an outer impeller housing 40 on which the connecting flange 39 is mounted and in which a runner element 41 is arranged to drive, at a central bore 42, an output shaft provided for connection to the input of the speed reducer 34. In operation, the impeller housing 40 contains a fluid medium by which its rotary motion imparted from the power take-off 35 is imparted to the runner element 41 for driving the speed reducer 34 in a manner that allows slipping between the impeller housing 40 and the runner element 41 whenever the compressor plate 17 is stalled within the refuse body 10 either by maximum possible compression of refuse within the body 10 or by abutment at either end thereof.

The manner of operating the refuse body 10, starting with the body 10 empty, consists in bringing the compressor plate 17 forwardly to its position ahead of the side loading doors 11 and 12, which are opened to allow loading of refuse therethrough rearwardly of the compressor plate 17. As the refuse is loaded it is worked rearwardly in the body 10 by actuation of the compressor plate 17 through the previously described power transmission system, the operating lever 36 being manipulated first to engage the power take-off 35 for connection through the clutch of motor truck 37 to drive the compressor plate rearwardly, for compressing the loaded refuse against the closed rear dumping door 13, and then to reverse the power take-off 35 and return the compressor plate 17 to its forward position for further loading of refuse. In this way the body 10 can usually be loaded with at least twice the amount of uncompressed refuse it would carry. When a full load of compressed refuse is accumulated within the body 10, the motor truck 37 may be driven to a selected dumping site, and, with the rear dumping door 13 opened, the compressor plate 17 may again be actuated rearwardly to reject the load completely from the body 10.

The present invention has been described in detail above for purposes of illustration only and is not intended to be limited by this description or otherwise except as defined in the appended claims.

I claim:

1. A refuse body, for compressing and transporting refuse therein and adapted to be mounted on a motor truck and operated by power supplied from the truck motor, comprising an elongated body, having side loading doors therein and dumping doors, closing an end thereof, a compressor plate located transversely within said body and arranged to move longitudinally therein for compressing refuse loaded through said side doors against said dumping doors, a reversible power take-off arranged for engagement with the truck motor, a speed reducer connected to the power take-off for supplying propelling power to the compressor plate, flexible means connecting said speed reducer for pulling said compressor plate longitudinally within said body in either direction, and a fluid coupling interposed between said speed reducer and power take-off for slipping upon stalling of said compressor plate within said body, said fluid coupling being openly exposed below said motor truck and truck body for heat dissipation at ambient conditions.

2. In a refuse body for compressing and transporting refuse therein and adapted to be mounted on a motor truck and operated by power supplied from the motor truck and having an elongated body with loading and dumping doors, a compressor plate located transversely within the body and arranged to move longitudinally therein for compressing refuse loaded through the loading doors, a reversible power take-off arranged for engagement with the truck motor, a speed reducer connected to the power take-off for supplying propelling power to the compressor plate, and flexible means connecting said speed reducer for pulling said compressor plate longitudinally within said body in either direction, the improvement comprising a fluid coupling interposed between said speed reducer and power take-off for performing the dual functions of transmitting power from the motor truck through the power take-off to the speed reducer and compressor plate under normal load conditions without substantial slipping and for slipping under excessive load conditions that stall the compressor plate, whereby the motor truck idles without choking or stalling under said excessive load conditions.

3. A refuse body as defined in claim 2 and in which the fluid coupling is a fluid clutch exposed to the atmosphere for dissipation of heat generated during slipping of the fluid clutch under excessive load conditions.

4. In a refuse body for compressing and transporting refuse therein and adapted to be mounted on a motor truck and operated by power supplied from the motor truck and having an elongated body, with loading and dumping doors, a compressor plate located transversely within the body and arranged to move longitudinally therein for compressing refuse loaded through the loading doors, a reversible power transmission system incorporating a power take-off arranged for engagement with the truck motor and a speed reducer connected to the power take-off for supplying propelling power to the compressor plate, and flexible means connecting said speed reducer for pulling said compressor plate longitudinally within said body in either direction, the improvement comprising a fluid coupling interposed between said speed reducer and power take-off for performing the dual functions of transmitting power from the motor truck through the power take-off to the speed reducer and compressor plate under normal load conditions without substantial slipping and for slipping under excessive load conditions that stall the compressor plate, whereby the motor truck idles without choking or stalling under said excessive load conditions.

References Cited in the file of this patent

UNITED STATES PATENTS

| Number | Name | Date |
| --- | --- | --- |
| 2,002,993 | Ehrick et al. | May 28, 1935 |
| 2,226,801 | Black | Dec. 31, 1940 |
| 2,239,129 | Szekely | Apr. 22, 1941 |
| 2,258,988 | Le Laurin | Oct. 14, 1941 |
| 2,557,003 | Le Laurin | June 12, 1951 |
| 2,680,377 | Gerst | June 8, 1954 |